(12) United States Patent
Nobileau (10) Patent No.: US 7,490,676 B2
(45) Date of Patent: Feb. 17, 2009

(54) METHOD AND SYSTEM FOR TUBING A BOREHOLE IN SINGLE DIAMETER

(76) Inventor: Philippe Nobileau, 2 avenue Fernand Martin, Villefranche sur Mer (FR) 06230

( * ) Notice: Subject to any disclaimer, the term of this patent is extended or adjusted under 35 U.S.C. 154(b) by 0 days.

(21) Appl. No.: 10/416,773

(22) PCT Filed: Oct. 8, 2001

(86) PCT No.: PCT/FR01/03091

§ 371 (c)(1),
(2), (4) Date: Jul. 6, 2005

(87) PCT Pub. No.: WO02/29207

PCT Pub. Date: Apr. 11, 2002

(65) Prior Publication Data

US 2006/0254778 A1   Nov. 16, 2006

(51) Int. Cl.
*E21B 33/13* (2006.01)
*E21B 33/138* (2006.01)
(52) U.S. Cl. .......................... 166/380; 166/292; 175/64; 175/65
(58) Field of Classification Search .................. 166/277, 166/380, 384, 207, 208, 212
See application file for complete search history.

(56) References Cited

U.S. PATENT DOCUMENTS

| | | | |
|---|---|---|---|
| 3,104,703 A | | 9/1963 | Rike et al. |
| 3,358,769 A | * | 12/1967 | Berry .......................... 166/207 |
| 3,489,220 A | | 1/1970 | Kinley |
| 5,291,956 A | | 3/1994 | Mueller et al. |
| 5,337,823 A | * | 8/1994 | Nobileau ..................... 166/277 |
| 5,348,095 A | * | 9/1994 | Worrall et al. ............... 166/380 |
| 5,411,085 A | | 5/1995 | Moore et al. |
| 5,494,106 A | * | 2/1996 | Gueguen et al. ............ 166/277 |
| 5,667,011 A | | 9/1997 | Gill et al. |
| 5,794,702 A | * | 8/1998 | Nobileau ..................... 166/380 |
| 6,012,523 A | * | 1/2000 | Campbell et al. ........... 166/277 |
| 6,446,323 B1 | | 8/2002 | Metcalfe |
| 7,159,666 B2 | * | 1/2007 | Nobileau ..................... 166/380 |
| 7,195,064 B2 | * | 3/2007 | Cook et al. .................. 166/277 |
| 7,225,879 B2 | * | 6/2007 | Wylie et al. .................. 166/380 |

(Continued)

FOREIGN PATENT DOCUMENTS

EP          952306 A  * 10/1999

(Continued)

*Primary Examiner*—Frank Tsay (57) ABSTRACT

The invention concerns a method for casing a borehole which consists of successively lowering an unlimited plurality of strings of casing having a common diameter, the next one through the preceding one, to be installed one beneath the other and being sealingly connected. Thus a next casing (6) is lowered folded through the preceding casing (5) and the expansion process consists either in injecting pressurized fluid through the drillstring (54) towards the next casing (6) so as to re-inflate it, or the next casing (6) is a cylindrical pipe having a diameter smaller than the internal diameter of the preceding casing (5) and the expansion process consists in forcing a cylindrical gauge (52) from the top end (26) to the bottom bell (28) of the next casing (6) so as to increase its diameter to make it equal to the diameter of the preceding casing (5). The method can use a cementing shoe (34) and a metal-to-metal seal (29) between the casing string.

15 Claims, 10 Drawing Sheets

U.S. PATENT DOCUMENTS

2004/0154810 A1 * 8/2004 Nobileau .................... 166/384

FOREIGN PATENT DOCUMENTS

| GB | 2053326 | | | 2/1981 |
|---|---|---|---|---|
| GB | 2348223 | | | 9/2000 |
| GB | 2348223 | A | * | 9/2000 |
| WO | WO 98795 7 | A1 | * | 2/1998 |
| WO | WO 9955999 | | | 11/1999 |
| WO | WO 20037766 | A | * | 6/2000 |
| WO | WO 0050732 | | | 8/2000 |

* cited by examiner

METHOD AND SYSTEM FOR TUBING A BOREHOLE IN SINGLE DIAMETER

TECHNICAL FIELD

This invention relates in general to installing well casing in oil and gas wells and in particular to a method of running collapsed or expansible casing into the well through a preceding casing of a given diameter and rounding the collapsed casing into a cylindrical configuration or expanding the expansible casing into the same given diameter.

BACKGROUND ART

Oil and gas wells are typically drilled by installing a conductor pipe to first depth, then drilling the well to a second depth. Normally, a string of casing is made up by coupling together sections of pipe, each being about forty feet long, and lowering the string through the conductor pipe to the second depth. Cement is then pumped down the casing, which flows back up the annulus between the casing and the open borehole. Drilling is resumed to a third depth and the process is repeated with another smaller diameter nested casing. An even smaller diameter string of casing may be installed to a fourth depth.

Casing serves to support the borehole wall and to prevent undesired outflow of drilling fluid into the formation or inflow of fluid from the formation into the borehole from strata other than the target production strata. The nested arrangement of successively smaller casing strings requires a relatively large borehole at the upper part of the wellbore due to the thickness of the casing and couplings and also due to the minimum clearance necessary between casing to displace cement in the annulus space.

Large diameter wells are more expensive to drill since they request larger drillbit, more mud and more cutting disposal. Also, a casing with a large diameter has a lower operating pressure for the same wall thickness than a smaller diameter casing. Consequently, each casing may have to cover the preceding one up to the wellhead to enhance the well pressure capability, as the well goes deeper.

Whenever pressure is not critical for the production casing, which is the last casing lowered and in consequence the smallest in diameter, the last casing is run as liner of the preceding casing and thus instead of extending it up to the wellhead, the top of a liner is suspended from the inside surface of the preceding casing, generally at an elevation right above the shoe of the preceding casing. A certain length of casing is saved, also increasing the higher section of the well, but since the liners are always formed by the assembly of pipes of a diameter lower than the preceding casing, a bore restriction on a substantial length between the production zone and the wellhead still exists.

Lastly, today when a well is drilled in a unknown zone (exploratory drilling) it is necessary to increase the amount of casing in order to be able to face the possibility to have to case the well before having reached the targeted depths. To take care of this kind of difficulty, an extra casing is considered which requires to start to drill from the surface with the next size above what would be usually needed, with a substantial increase in the cost of exploratory drilling.

DISCLOSURE OF THE INVENTION

Consequently, the aim of the invention is to offer an economic method to case a well in which an unlimited plurality of casings of the same diameter are descended successively, the next through the preceding, to be installed one below the other and to be connected in a sealed manner.

Another goal of the invention is to reduce cutting volume and to allow the driller a large freedom on the number of casings to be run down to deliver the well objectives in full safety.

The object of the invention is thus a method to case a well in which, after each drilling phase to a predetermined depth using a drillpipe, a casing is lowered into the well with each successive casing being lowered down through the preceding casing and the top of the next casing being connected in a sealed manner to the preceding casing. This method includes the step of:

lowered into the well through the preceding casing having a common diameter, the next casing in a form whose greatest transverse dimension is smaller than the internal diameter of the preceding casing with the top of the next casing being suspended to the drillstring, positioning the top of the next casing near the foot of the preceding casing, expanding the diameter of the next casing so that the diameter of the next casing is equal to the common diameter, establishing a sealed connection between the top of the next casing and the foot of the preceding casing.

According to a first embodiment of the invention, the next casing is lowered folded up through the preceding casing and the step of expansion consists in sending fluid under pressure through the drillstring down the next casing so as to re-inflate it, then an expansion mandrel is forced from the top to the foot of the next casing so that the casing has a cylindrical form whose diameter is equal to the common diameter.

According to a second embodiment of the invention, the next casing is a cylindrical pipe having a diameter smaller than the internal diameter of the preceding casing and the stage of expansion consists in forcing an expansion mandrel from the head to the foot of the next casing so as to increase its diameter to make it equal to the common diameter.

BRIEF DESCRIPTION OF THE DRAWINGS

The FIGS. 4a to 4c are sectional views of the casing folded up, from the running tool to the shoe, in the lowering phase configuration according to the first embodiment of the invention.

The FIG. 4d is a sectional view of the shoe in the lowering phase configuration according to the second embodiment of the invention.

The FIGS. 5a and 5b are sectional views of the running tool and shoe, of the FIGS. 4a-4c after the folded up lining and the foot of lining were re-inflated according to the first embodiment of the invention.

The FIGS. 6a and 6b are sectional views of the running tool and shoe of the FIG. 4d, after the bottom head of casing was re-inflated, of the expansible casing according to the second embodiment of the invention.

The FIG. 7a is a sectional view of a portion of the running tool of the FIGS. 4a and 4b when it is pushed downwards to expand the top of the casing according to the first embodiment of the invention.

The FIG. 7b is a sectional view of a portion of the running tool of the FIGS. 4a and 4b when it is pushed downwards to expand the top of the casing according to the second embodiment of the invention.

The FIG. 8a is a sectional view of the gauge detached from the running tool gauging the re-inflated casing according to the first embodiment of the invention.

The FIG. 8b is a sectional view of the expanding tool detached from the running tool expanding the expandable casing according to the second embodiment of the invention.

The FIG. 9 is a sectional view illustrating the expansion mandrel located at the shoe and reconnected with the running tool according to the second embodiment of the invention.

The FIG. 10 is a sectional view illustrating the running tool swaging the casing head according to the first or the second embodiment of the invention.

The FIG. 11 is an enlarged partial sectional view of the swaging area of FIG. 10.

BEST MODE FOR CARRYING OUT THE INVENTION

Figure 1:
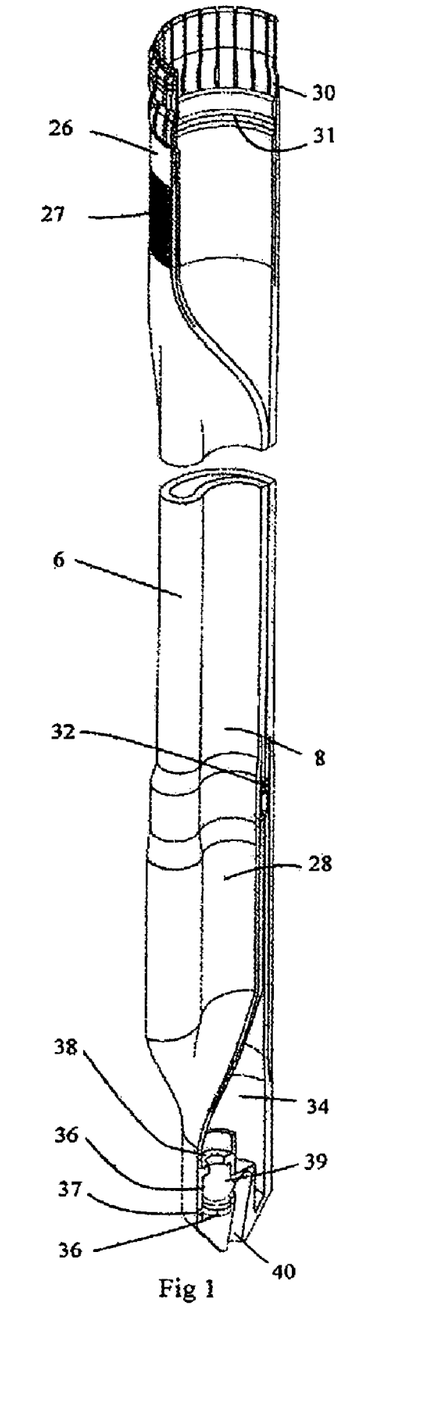
FIG. 1 is a partial sectional perspective view for a lining folded up according to the first embodiment of the invention.

Referring on FIG. 1, string 6 is formed of multiple sections of collapsible casing 8. The string 6 is comprised of a top end 26 connected by joints of casing 8 to a bottom end 28 also collapsed and a cement shoe 34 only partially collapsed. The top end 26 can act as a casing hanger and includes collet fingers 30 for this purpose. The top hanger 26 of casing also comprises circumferential triangular grooves 27 on its external surface. Preferably, a soft metal coating is laid out in triangular bottom of groove 27 to facilitate sealing. The peaks of the triangular grooves make it possible to increase the contact pressure to obtain metal-to-metal sealing. A profile with interior groove 31 is laid out on the internal diameter top hanger 26 to allow the attachment to the running tool for installation 50 (FIG. 4b). Casing 8 connected to the top end 26 can extend in casing 6 for several thousand meters.

The bottom end 28 comprises of an internal recess profile 32 that is designed to mate with the collet fingers 30 of the top hanger 26 of the next string (not shown) that will be suspended below. Bottom bell 28 has internal circumferential wickers 29 (FIG. 9) that similarly mate with the wickers 27 of the top hanger 26 of the next string (not shown) that will be suspended below.

Cement shoe 34 is offset from the axis of the string 6 and comprised of a check valve 35 with a top valve seat 38; a bottom valve seat 36 held in place by a shear pin 37 and sealed to the cement shoe 34 by seals; a movable ball 39; and a fluid passage 40 fluidly linked to and below the check valve 35. The shoe which is partially collapsed can be made of aluminium in order to be easily milled by conventional drillbits.

FIG. 1 shows string 6 and the bottom bell 28 in a collapsed configuration. Top hanger 26 and cement shoe 34 do not collapse. Top hanger 26 is later first cylindrically expanded (FIG. 7a) to allow the running tool and drift tool to go through and is finally locally expanded in a swage connection with the bottom bell 28 of a previously installed string of casing.

Figure 2:
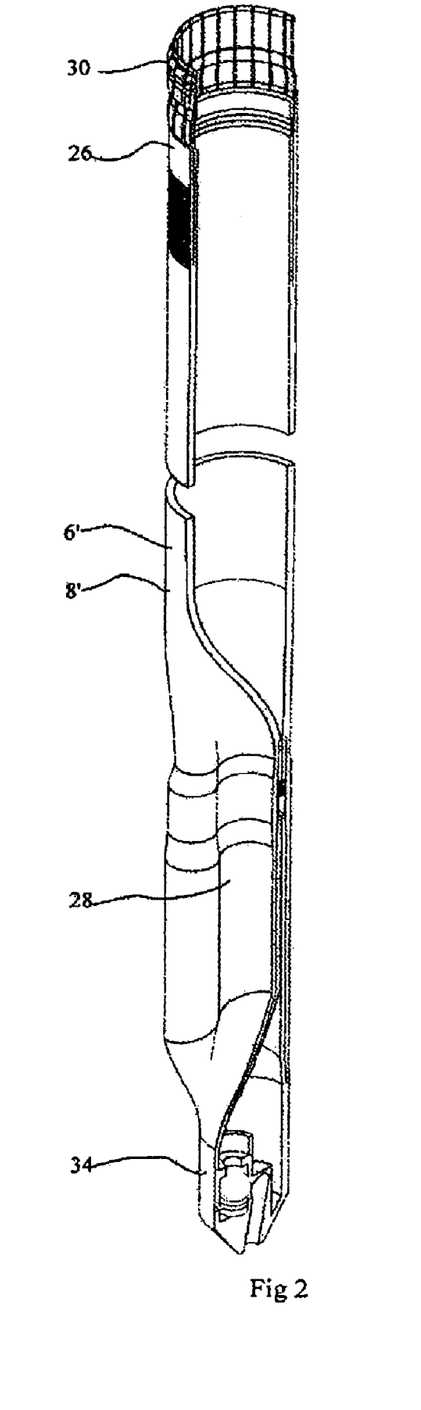
FIG. 2 is a partial sectional perspective view for an expansible casing according to the second embodiment of the invention.

FIG. 2 shows the same configuration of string as FIG. 1 except that the string consists of expandable pipes 8' and not collapsed 8' but the same expandable top hanger 26 and bottom bell 28 describes on FIG. 1 are used.

Figure 3:
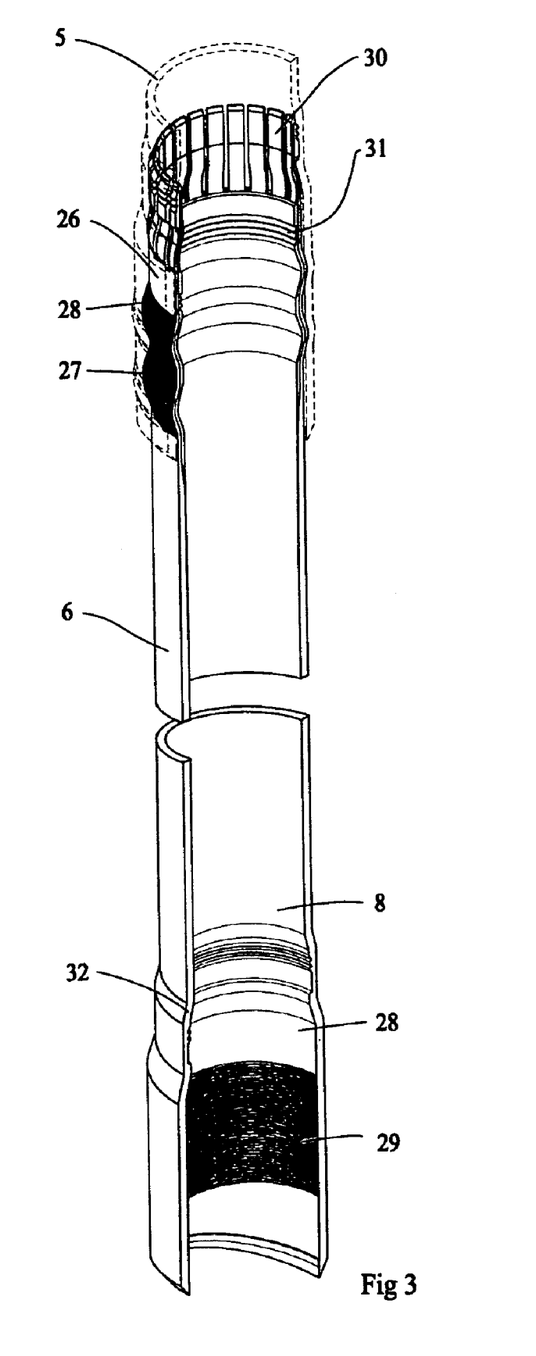
FIG. 3 is a partial sectional perspective view for the final casing according to the first or the second embodiment of the invention with the top of the casing forged in the foot of the preceding casing and the shoe drilled.

Referring to FIG. 3, the top hanger 26 has engaged the previously run, rounded and cemented string 5 with collet fingers 30. Wickers 27 have been deformed to sealingly mate with the wickers 29 of the preceding string 5. Casing 8 has been rounded.

Figure 4A:
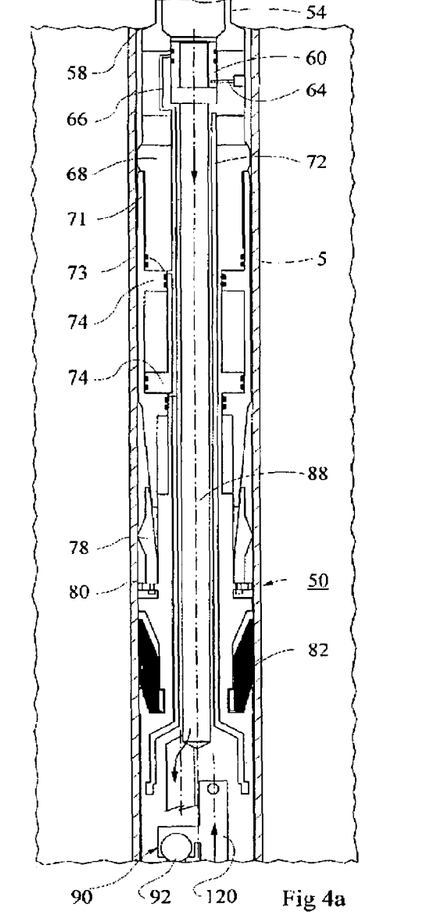
Figure 4B:
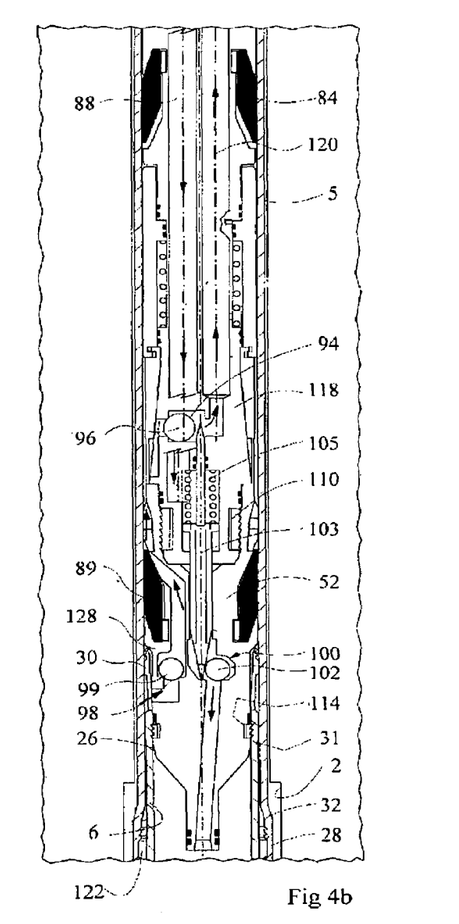

Referring to FIGS. 4a and 4b, a running tool 50 is used to install a string of collapsible casing 6 in a well 1. The running tool 50 includes a detachable gauge 52 that is shown mounted to the bottom of the running tool 50. The top of the running tool 50 is mechanically and fluidly connected to the drill pipe 54, which extends to the surface. There is an annulus 58 for return of fluids to the surface located between the drill pipe 54 and a string 5 of previously installed casing.

An annular sliding valve 60 is located at the top end of the running tool 50. When fluid is pumped down the drill pipe 54, it flows through sliding valve 60 and into the running tool 50. Sliding valve 60 is sealed within a chamber in running tool 54 and initially held in place by a shear pin 64. While in the upper position shown in FIG. 4a, sliding valve 60 blocks a bypass passage 66 that leads to two piston chambers 73.

An upper fluid return passage 72 is fluidly connected to drill pipe annulus 58. Return passage 72 extends through an upper body 68 of the running tool 50. A sleeve 71 having a pair of piston elements 74 is axially movable relative to upper body 68, and there are multiple seals between the upper body 68 and the piston elements 74. There are multiple annular chambers 73 between the upper body 68 and the piston elements 74.

A forging or swaging ring 78 is located on the lower side of the lower piston element 74, and attached to the upper body 68 by attachment elements 80. Sleeve 71 terminates at the upper portion of swaging ring 78 by an actuating cone. An upper cup tester 82 and a lower cup tester 84 provide a seal between the upper running tool body 68 and the previously installed and cemented casing 5. A middle running tool body 86 is located beneath and secured to upper body 68. A lower running tool body 118 is located beneath the middle running tool body 86. The detachable gauge 52 is located beneath the lower running tool body 118.

The detachable gauge 52 has a threaded receptacle secured to lower tool body by a threaded ratchet ring 110 located on the lower running tool body 118. An engaging member 114 is mounted to detachable gauge 52 for engaging grooved profile 31 in top hanger 26 of the string of casing 6. Detachable gauge 52 has a drifting element 128.

A downward flow passage 88 runs the length of the running tool 50 and the detachable gauge 52. Return fluid flows up an annulus 122 that initially exists between the new casing string 6 and the previously installed casing string 5. Annulus 122 extends between the detachable gauge 52 and the installed casing string 5 bypass the drift tool cup tester 89 through a bottom check valve 98 and communicates with a port leading to a middle check valve 94 just prior to entering the lower fluid passage 120. The lower check valve 98 comprises a ball 99 and the middle check valve 94 comprises a ball 96. Check valve 94 is located at the lower end of a return flow passage 120. The returning fluid through passage 120 encounters an upper check valve 90 prior to entering an upper return fluid passage 72. The upper check valve 90 is comprised of a ball 92 and is connected by a port to the annulus 122 surrounding running tool 50. Upper check valve 90 is located above lower cup tester 84 while middle check valve 94 is located below. Upper check valve 90 will allow inward flow from annulus 122 into passage 72 but not an outward flow. Upper flow passage 72 leads to the drill pipe annulus 58. The downward flow passage 88 encounters a lower check valve 100 after entering the detachable gauge 52. The lower check valve 100 is comprised of a ball 102 within a portion of fluid passage 88.

An axially movable mandrel 103 is carried in lower running tool body 118 and detachable gauge 52, as shown in FIG. 4b. Mandrel 103 has an upper pointed end that extends through a passage and actuates ball 96. A lower pointed end extends into a passage in detachable gauge 52 and actuates lower ball 102. A coil spring 105 urges mandrel 103 downward. In the position shown in FIG. 4b, the upper end of mandrel 103 prevents ball 96 from moving to the right to a blocking or seated position in check valve 94. The lower end of mandrel 103 prevents ball 102 from moving to the left to a blocking position in check valve 100.

Figure 4C:
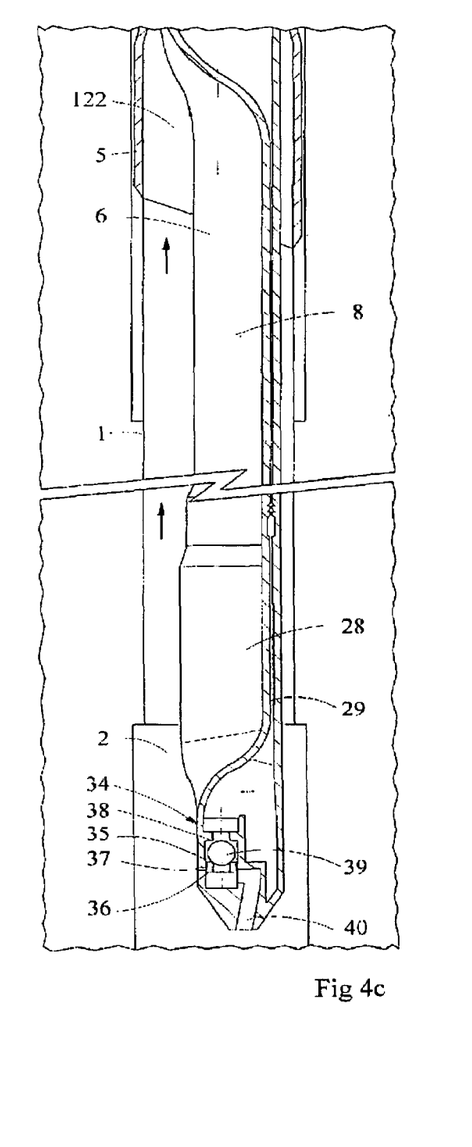

FIG. 4C shows cement shoe 34 in a collapsed configuration and lowered into an under-reamed section of the well. While being lowered on drill pipe 54, casing string 6 will be supported by engaging member 114 on detachable gauge 52, which engages grooved profile 31. This position is shown in FIG. 4b, with running tool 50 and casing 6 being lowered through previously installed casing string 5.

Figure 5A:
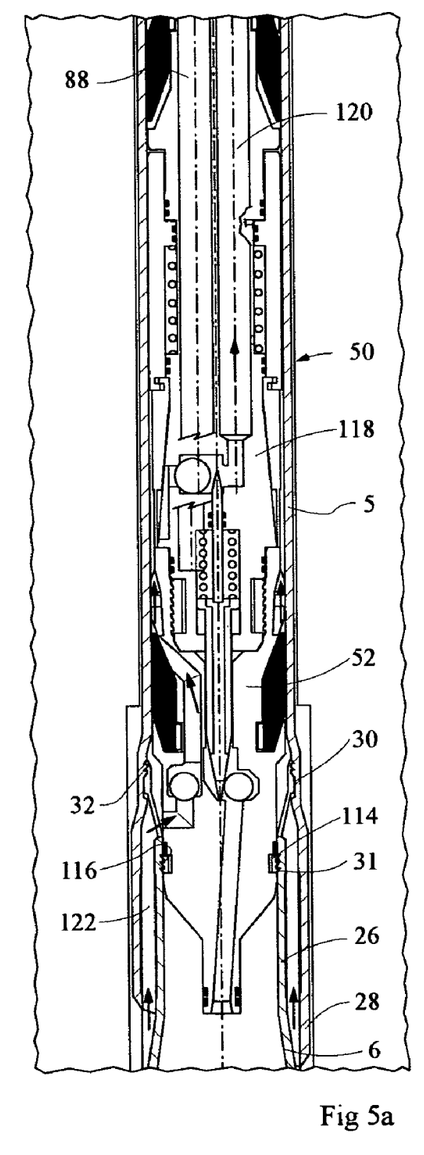
Figure 5B:
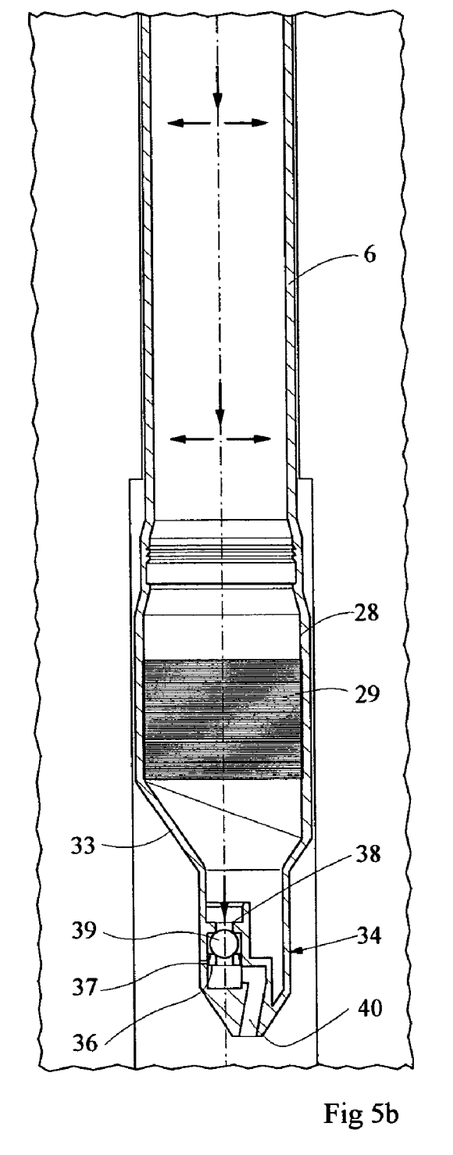

When reaching the desired depth, collet fingers 30 of top hanger 26 of casing string 6 will snap into grooved profile 32 in bottom bell 28 at the lower end of previously installed casing string 5. This engagement is shown in FIG. 5a. This engagement stops further downward movement of drill pipe 54 and casing string 6. Then, casing string 6 and the upper portion of cement shoe 34 are inflated by applying fluid pressure from the surface. FIGS. 5a and 5b show casing 6 and cement shoe 34 after being inflated. A fluid, such as water or drilling fluid, is pumped down drill pipe 54. The fluid flows through valve 60 (FIG. 4a) down passage 88. The fluid flows through check valve 102 and discharges into casing string 6. At the lower end of casing string 6, the high pressure fluid flows into cement shoe 34 and is initially blocked from flowing out passage 40 by check valve 39, which is initially held in the upper position of FIG. 4c by shear pin 37 and seat 36. The fluid pressure causes casing 6 and bottom bell 28 to round by inflation. When a selected pressure is reached, shear pin 37 shears, allowing seat 36 to move downward to the position shown in FIG. 5b. This maximum pressure is selected to assure that casing string 6 and bottom bell 28 are enough rounded. The fluid can now discharge from passage 40 of casing shoe 34 into the well.

When casing 6 inflates, well fluid initially surrounding the string of casing 6 will be displaced. Referring to FIG. 5a, the fluid flows through annulus 122 in the overlap between the previously installed casing 5 and the string 6 being installed. Because of lower cup tester 84 engaging previously installed casing string 5, the displaced fluid cannot flow upward around running tool 50. The fluid flows through the lateral port of check valve 94, and from check valve 94 into return flow passage 120 (FIG. 5a). The fluid flows from return flow passage 120 into upper return passage 72 (FIG. 4a), and from there into annulus 58 surrounding drill pipe 54 to return to the surface.

Figure 7A:
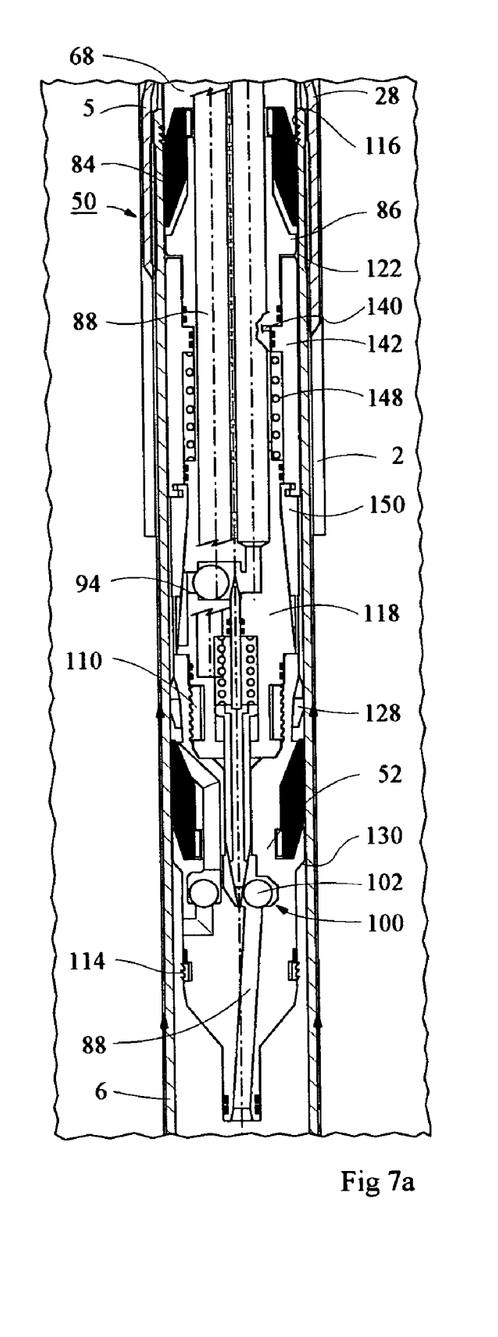

After inflating, as shown in FIGS. 5a and 5b, detachable gauge 52 will be pumped downward from running tool 50 to cement shoe 34 to round out imperfections in casing string 6. This is handled by closing a blowout preventer (not shown) at the surface around drill pipe 54 and applying pressure to annulus 58 surrounding drill pipe 54. The pressure acts against upper cup tester 82 (FIG. 4a), causing upper body 68 to move downward with drill pipe 54 a short distance into casing string 6. Engaging member 114 releases from groove 116 and moves downward in casing string 6 as shown in FIG. 7a. Collet 30 (FIG. 5a) continues to support the weight of casing string 6. The upper cup tester 82 of running tool 50 will still be above the lower end previously installed casing string 4, and the lower cup tester 84 will be now located in the top hanger 26 of lower string 6. Once at the desired position, the operator stops pumping fluid on drill pipe annulus 58.

Then drill pipe 54 is rotated to the right. Detachable gauge 52 has left-hand threads connecting it to ratchet ring 110 of lower running tool body 118, and detachable gauge 52 also has anti-rotation engaging members (not shown) that frictionally engage the inner wall of casing string 6. Running tool 50 rotates with drill pipe 54, unscrewing detachable gauge 52, as shown in FIG. 14a. When detachable gauge 52 separates from lower tool body 118, mandrel 103 remains with lower tool body 118. Mandrel spring 105 pushes mandrel 103 downward, allowing ball 96 to move to a seated position, blocking upward flow through check valve 94. Also, the absence of mandrel 103 in check valve 100 allows ball 102 to close passage 88 leading downward from check valve 100. The closure of check valves 94 and 100 and bottom cup tester 89 with lower cup tester 84 allow fluid pressure to drive down detachable gauge 52.

Figure 9:
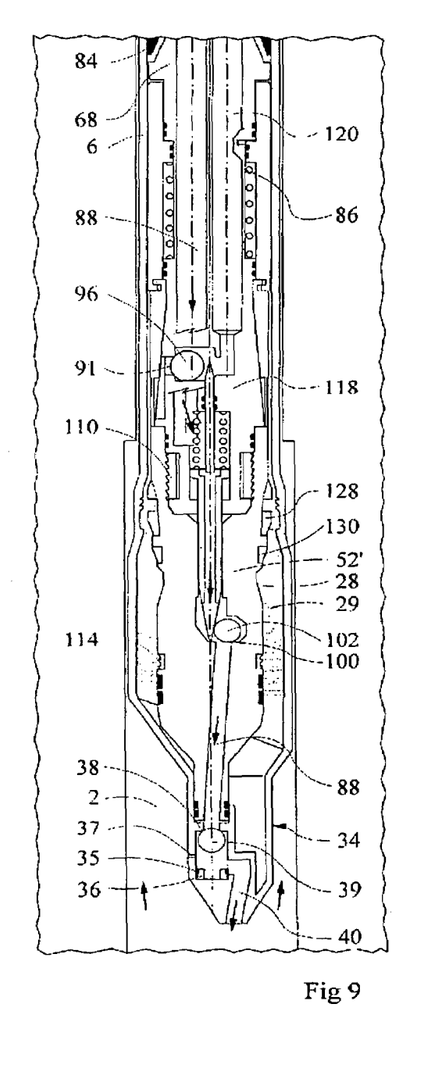

Once unscrewed, the operator applies internal fluid pressure to drill pipe 54. The pressure flows through passage 88 and out the lower end of lower body 118. This pressure enters port 140 driving down actuating sleeve 142 which push slips 150 over the conical profile of tool body 118 against the inner wall of installed casing string 5 to prevent running tool 50 to move upward. Helicoidal spring 148 prevented the locking of slips 150 during lowering of casing 6 through casing 5. This pressure acts also against the cup tester 89 of detachable gauge 52, forcing it downward. Drifting elements 128 will round out casing string 6 to the desired configuration as detachable gauge 52 moves downward in lower casing string 6. At the lower end of casing string 6, detachable gauge 52 will enter cement shoe 34, as shown in FIG. 9 for the second embodiment. The lower concentric end of detachable gauge 52 enters a receptacle in cement shoe 34 directly above ball 39. Then the operator stops pumping fluid through drill pipe 54.

The operator then lowers running tool 50 on drill pipe 54 until lower body 118 reengages with detachable gauge 52, as shown in FIG. 9. Mandrel 103 will stab back into the passage in detachable gauge 52, opening check valve 100. The upper end of mandrel 103 pushes ball 96 to the left, opening check valve 94. The split ratchet ring 110 allows detachable gauge 52 to reconnect to running tool 50 by a straight downward stabbing movement.

The operator then pumps cement downward through drill pipe 54, which flows through running tool passage 88 and check valve 39 of cement shoe 34. The cement flows up the annulus surrounding lower casing string 6. Well fluids displaced by the cement return through annulus 122 (FIG. 4b) and check valve port 104 and back up return flow passage 120. Ball 39 of the cement shoe 34 prevents cement to back flow up running tool 50.

Figure 10:
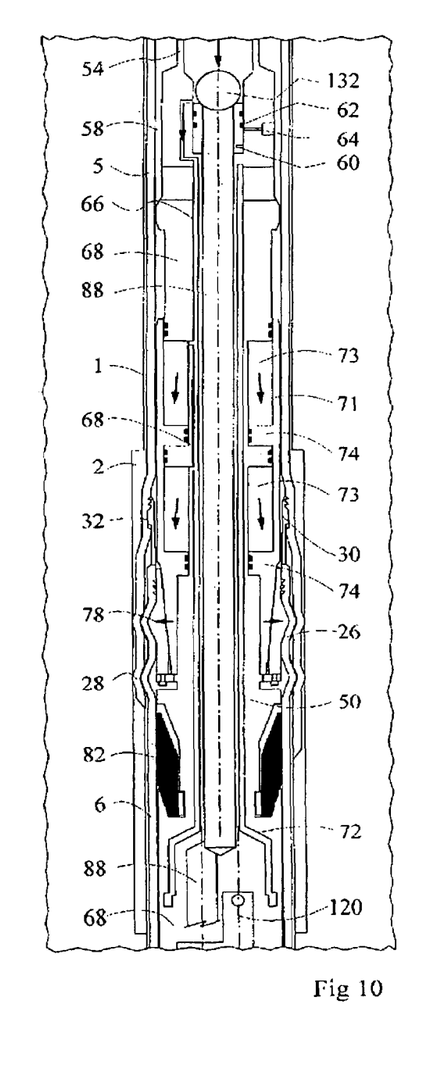
Figure 11:
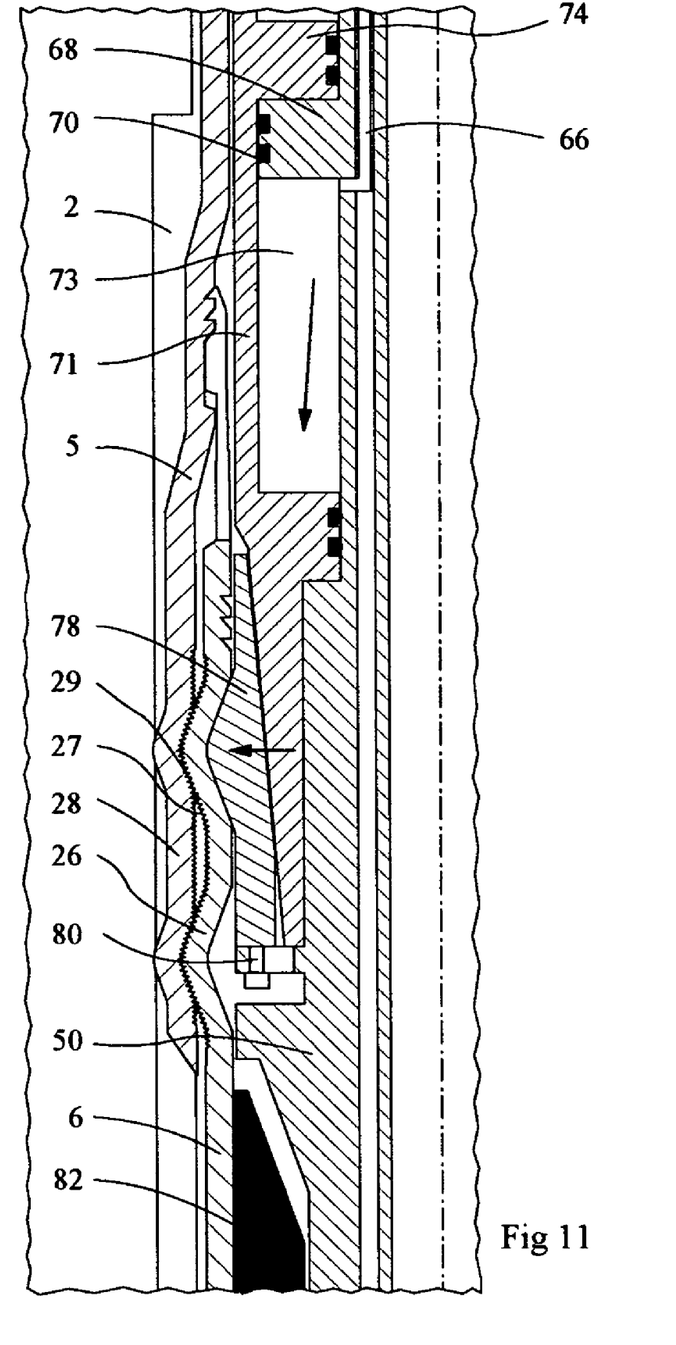

While the cement is curing, the operator pulls running tool 50 back up to the upper end of lower casing string 6 to swage top hanger 26 to the bottom bell 28 of previously installed casing string 5. Detachable gauge 52 will continue to remain in engagement with running tool 50. The swaging is illustrated in FIGS. 10 and 11. The operator drops a ball 132 through drill pipe 54, which lands on sliding valve 60, closing passage 88. Pumping downward through drill pipe 54 causes shear pin 64 to shear, allowing sliding valve 60 to move downward. This opens bypass passage 66 that leads to the two piston chambers 73. The pressure acts against pistons 74, causing sleeve 71 and upper body 68 to move apart from each other. This causes forging ring 78 to be cammed outward, deforming top hanger 26 into sealing engagement with bottom bell 28. Wickers 27 and 29 engage each other for sealing, aided by a soft inlay of metal.

The operator then relieves the swaging pressure and pressure tests the sealing capability using upper cup tester 82. This is done by closing the blowout preventer around drill pipe 54 and applying pressure to drill pipe annulus 58. The lower tester cup 82 prevents flow downward past running tool 50. If the connection leaks, the pressure will fail to hold. If there is no leakage, the operator pulls running tool 50 from casing string 5. After installation, casing strings 5 and 6 will have the same inner and outer diameters. If the well is to be drilled deeper, casing shoe 34 will be drilled out as it is made of a frangible metal as aluminum. The offset position reduces the chances of it rotating in unison with a rotating drill bit. It also includes a transition cone 33 which has a revolution axis inclined to the axis of the well to prevent drilling through the wall of the cone 33 around the circumference at the same time.

In the second embodiment, referring to FIG. 2, the casing 8' is not collapsed, rather it is cylindrical when run into the well. Casing 8' can be expanded to obtain the same dimension than casing 8 when rounded. Casing 8' can be made up of sections approximately 12 meters in length that are secured by threaded connectors while being run, as in conventional casing. However, expandable casing 8' has a smaller diameter while being run so as to pass through previously set string of the same dimension but after being expanded. Casing 8' is expanded to the same diameter as the upper string or strings of casing after reaching the desired depth. For example, casing 8' may have an outer diameter of 6-¼ inch while running and an expanded outer diameter of 7 inch. The string of casing 8' will shrink in length while expanding.

Figure 4D:
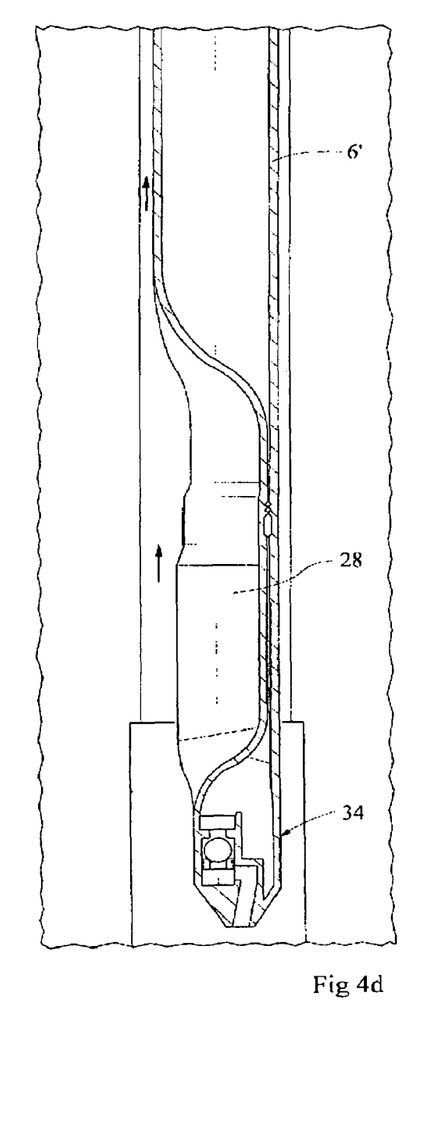
Figure 8A:
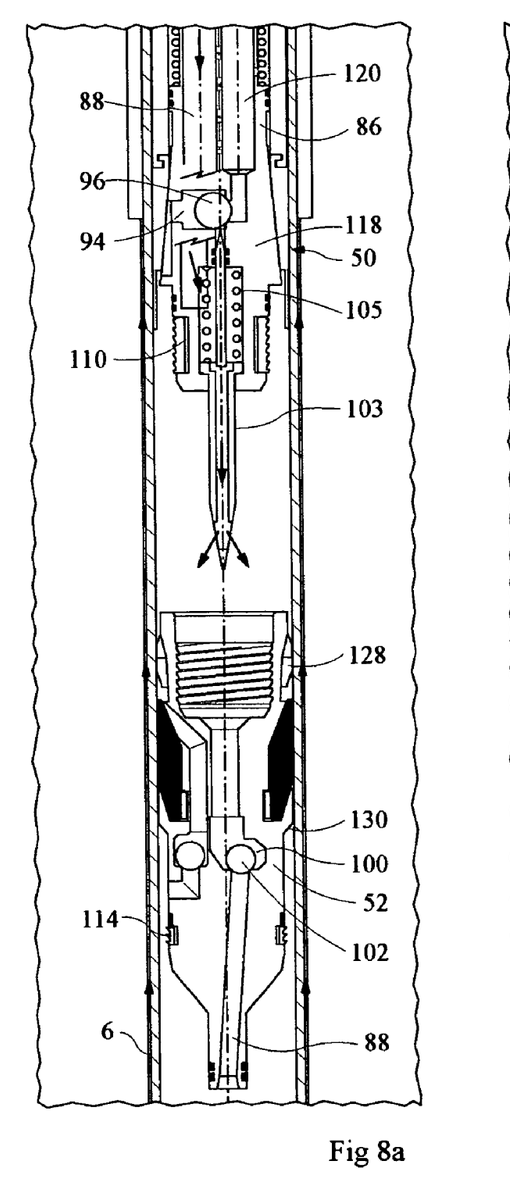

The same running tool 50, expandable top hanger 26, and collapsible bottom bell 28, and cement shoe 34 are employed. The same numbers will be used in the second embodiment, except for the prime symbol when referring to the casing. The assembly in FIG. 8 initially will be run in with a string 6' of casing 8' that is in a cylindrical configuration but is expandible. Because lower bell 28 is of a larger diameter than the previously installed string of casing, it will be collapsed in the same manner as the first embodiment shown in FIG. 1. The sections 8' of casing string 6' are screwed together at the surface and attached to running tool 50 with top hanger 26 (FIG. 4a). Running tool 50 is lowered on drill pipe 54 until reaching the desired depth. FIG. 4d shows collapsed bottom bell 28 and cement shoe 34 attached to unexpanded casing string 6' as it is lowered through previously run casing 5'.

Figure 6A:
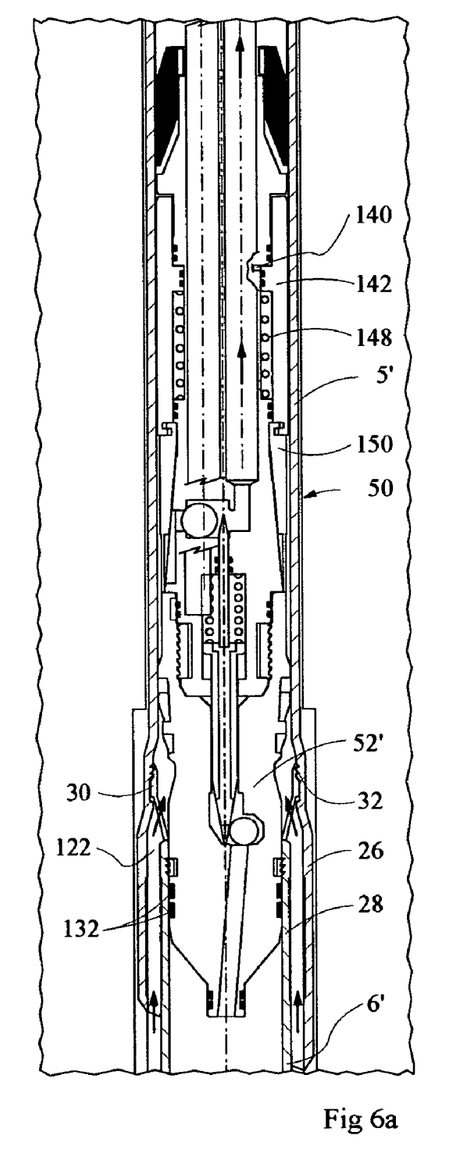
Figure 6B:
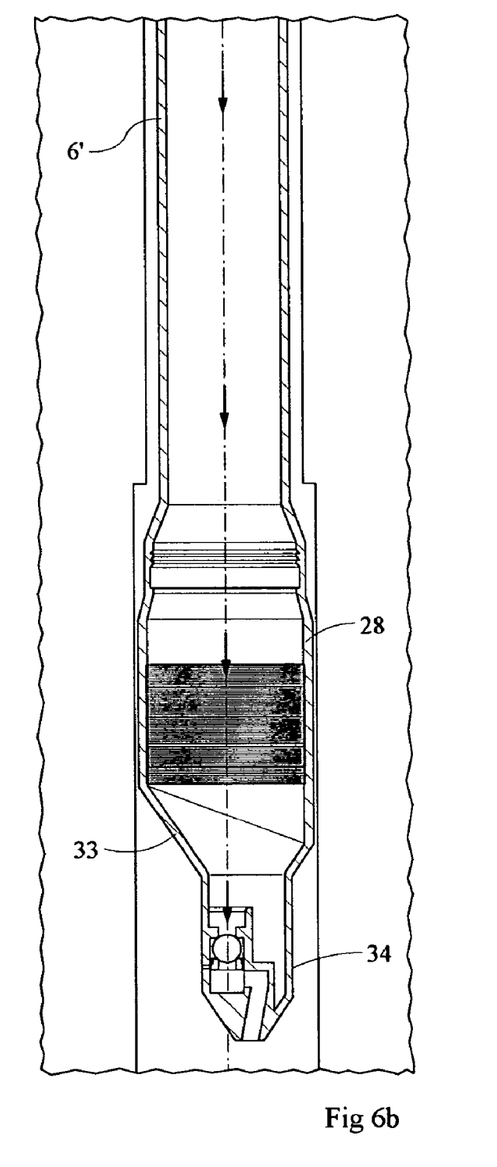
Figure 7B:
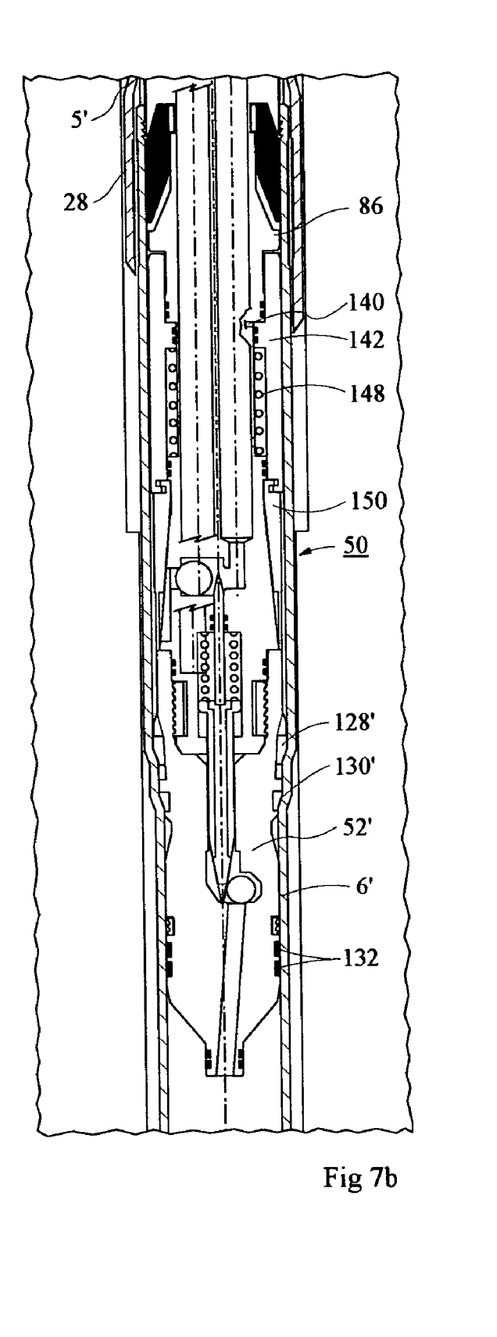

As illustrated in FIG. 6a, collet fingers 30 of the top hanger 26 will snap into grooved profile 32 of the bottom bell 28 of the previously installed string 5'. The operator applies pressure to drill pipe 54 which causes bottom bell 28 of string 6' to inflate as shown in FIG. 6b. The fluid pressure transmits through running tool 50 in the same manner as the first embodiment. Running tool 50 is then pushed down a short distance to the position shown in FIG. 7b, with expanding elements 128', and a lower expanding element 130' with a smaller outside diameter than the upper drifting element 128' located within casing string 6'. By locating two or more expanding elements having different expanding diameters, we prevent early striction to occur on the expanding cone triggered by small defects. This downward movement occurs by applying pressure to the drill pipe annulus 58 (FIG. 6a), which acts against lower cup tester 82 to push the entire assembly downward. As drift elements 128, 130 entered lower string 6', they began expanding the string of casing 6' to the desired diameter.

Figure 8B:
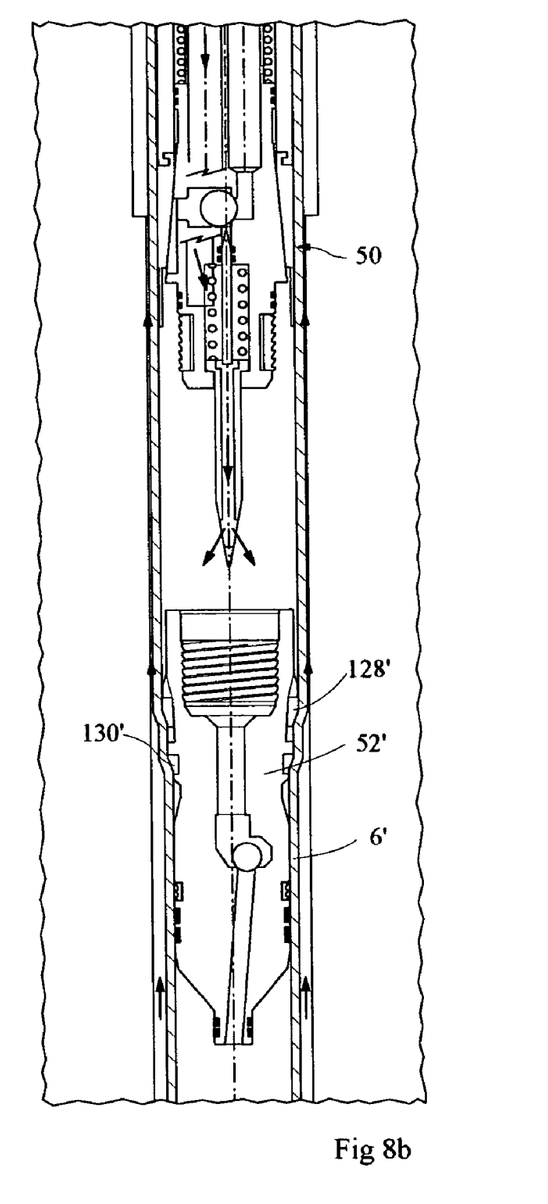

The operator then unscrews detachable expansion mandrel 52' in the same manner as the first embodiment the detachable gauge 52. The operator pumps down drill pipe 54 to push detachable expansion tool 52' downward relative to running tool 50, as shown in FIG. 8b. This also is performed in the same manner as in the first embodiment except that seal 132 is used to drive the detachable tool down instead cup tester 89. Smaller seals can be used since expansible casing has a better internal surface offering less friction than conventional casing as it is used for collapsible casing. As detachable expansion mandrel 52' moves downward, it expands casing string 6' to the desired diameter. There will be some displaced fluid that was located in the annulus surrounding casing 6'. This displaced fluid flows through annulus 122 (FIG. 4b), check valve 94, returns fluid passages 120 and 72 to drill pipe annulus 58 (FIG. 4a)

When detachable expansion mandrel 52' reaches cement shoe 34, the operator lowers running tool 50 on drill pipe 54 until running tool 50 reengages with detachable expansion mandrel 52'. This is done in the same manner as in the first embodiment, and the assembly will appear as shown in FIG. 9. The operator pumps cement down drill pipe 54, which flows out passage 40 and up the annulus surrounding casing string 6' in the same manner as the first embodiment. After cementing, the operator pulls running tool 50 back up to top hanger 26 and swages it into bottom bell 28 of casing string 5' in the same manner as in the first embodiment. This procedure is shown in FIGS. 10 and 11. The operator tests and drills out in the same manner as in the first embodiment.

As one can realize, a mono-diameter casing system can be obtained with either collapsible casing or expansible casing. The diameter reduction for installation through the preceding installed casing of the same dimension can be obtained from either technologies collapsible or expansible. In some case it might be advantageous to combine both technologies by first collapsing a 6-⅝" casing (168 mm), to an overall diameter of 6 inches (152 mm), and then instead drifting it with the same diameter of the original pipe expanding it to a 7 inch diameter (178 mm), therefore being able to use the heavy wall capability and low cold work of the collapsible technology with the good geometry of the expansible technology.

Despite the fact that the casing strings are made of coupled straight joints in the description, continuous casing on reel can also be used to obtain a monodiameter well casing system.

The invention claimed is:

1. Method for casing a well where after each drilling phase to a predetermined depth, a string of metal casing (6, 6') is run into the well, each successive metal casing being lowered through the previously run preceding casing (5, 5') and the top end (26) from the next casing being connected in a sealed way with said preceding casing (5, 5'); the method involves the following steps:
   a) running a next casing (6, 6') through a preceding casing (5, 5') having a common diameter, where said next casing (6, 6') has a largest transverse dimension smaller than the internal diameter of said preceding casing (5, 5'), the top end (26) of said next casing being secured to a drillstring (54);
   b) positioning the top end (26) of said next casing (6, 6') in the vicinity of a previously inflated bottom bell (28) of the preceding casing (5, 5'), said bottom bell having an inner diameter larger than said common diameter;
   c) expanding the diameter of said next casing (6, 6') so that the diameter of said next casing (6, 6') is equal to said common diameter; and d) establishing a sealed connection between the top end (26) of said next casing (6, 6') and bottom end (28) of said preceding casing (5, 5').

2. Method according to claim 1, in which said next casing (6, 6') is lowered, folded up, through said preceding casing (5, 5') and the expansion of the step c) consists of injecting a pressurized fluid through the drillstring (54) to said next casing (6, 6') so as to first re-inflate it, then second force a gauge from the top end (26) to the bottom bell (28) of the next casing (6, 6') in order that said next casing (6, 6') take a cylindrical form with a diameter equal to said common diameter.

3. Method according to claim 1, in which said next casing (6, 6') is a cylindrical pipe having a diameter smaller than the internal diameter of said preceding casing (5, 5')and the expansion of the step c) consists in forcing an expansion mandrel from the top end (26) to the bottom end (28) of the next casing (6, 6') so as to increase said next casing's diameter to said common diameter.

4. Method according to claim 1, in which the bottom bell (28) of said preceding casing (5, 5') is folded up when lowered, then inflated by injection of a pressurized fluid through the drillstring (54) before the step b) in order to gain a widened internal diameter larger than the common diameter.

5. Method according to claim 4, in which step b) of positioning of said top end (26) of said next casing (6, 6') consists in hanging the top end (26) of said next casing (6, 6') from said bottom bell (28) of said preceding casing (5, 5').

6. Method according to claim 5, in which said top end (26) of said next casing (6, 6') is hung by collet fingers (30) which allows the expansion of said top end (26) as well as a passage for the return fluid from the annulus space (122) between the casing and the wellbore.

7. Method according to claim 4, in which said top end (26) of said next casing (6, 6') is expanded by forcing a gauge/expansion mandrel (52, 52')through said top end (26) of said next casing (6, 6').

8. Method according to claim 4, in which a partially deformable cementing shoe (34) seals the lower end of said bottom bell (28) of said preceding casing (5, 5').

9. Method according to claim 8, in which said cementing shoe (34) comprises a rigid cylindrical lower end with a smaller diameter than the internal diameter of said preceding casing (5, 5') and this said lower end is offset compared to the axis of said preceding casing (5, 5') when said bottom bell (28) of said preceding casing (5, 5') is re-inflated.

10. Method according to claim 8, in which a drillable part of said cementing shoe (34) is in aluminum so as to be easily milled with conventional well drillbit.

11. Method according to claim 8, in which said next casing (6, 6') is cemented in said well by pumping up a cement slurry through said drillstring (54) and through said cementing shoe (34), and said fluid return flows between said top end (26) of said next casing (6, 6') and the bottom bell of said preceding casing (5, 5').

12. Method according to claim 4, in which said sealed connection is carried out by one or more plastic deformations or swedging of rings located on said top end (26) of said next casing (6, 6') so that external surface of each ring cooperates in a sealing way with enlarged interior surface of said bottom bell (28) of said preceding casing (5, 5').

13. Method according to claim 12, in which the enlarged interior surface of said bottom bell (28) of said preceding casing (5, 5') or said external surface of a plastically deformed ring comprises circular grooves (27 or 29) increasing a contact pressure to achieve a metal-to-metal type sealing.

14. Method according to claim 13, in which said surfaces cooperating to carry out said sealed connection comprises grooves with same pitch (27, 29) and a soft metal is laid out in bottom of groove to allow interpenetration of the grooves in order to improve tolerance to debris and scratches.

15. Metal casing for casing a well comprising a previously installed preceding casing (5, 5') and a next casing (6, 6') lowered through said preceding casing, said preceding casing (5, 5') having a common diameter and said next casing (6, 6') having a largest transverse dimension smaller than the internal diameter of said preceding casing (5, 5'); said next casing (6, 6') comprising a bottom bell wherein said bottom bell is folded longitudinally in a collapsed configuration whose largest transversal dimension is smaller than the internal diameter of said preceding casing (5, 5') and is inflated by injection of a pressurized fluid to a cylindrical configuration having a diameter larger than said common diameter and wherein said next casing (6, 6') is expandable or inflatable to a cylindrical configuration having a diameter equal to said common diameter.

* * * * *